(12) United States Patent
Anzawa et al.

(10) Patent No.: US 6,373,223 B1
(45) Date of Patent: Apr. 16, 2002

(54) VOLTAGE EQUALIZING APPARATUS AND VOLTAGE EQUALIZING METHOD FOR BATTERY DEVICES

(75) Inventors: Seiichi Anzawa; Hiroshi Nishizawa, both of Nagano; Fujio Matsui, Tokyo, all of (JP)

(73) Assignees: Nagano Japan Radio Co., Ltd., Nagano; Fuji Jukogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/811,061

(22) Filed: Mar. 16, 2001

(30) Foreign Application Priority Data

Nov. 21, 2000 (JP) .......................................... 2000-354096

(51) Int. Cl.⁷ ................................................. H02J 7/00
(52) U.S. Cl. ........................................ 320/118; 320/116
(58) Field of Search ................................. 320/118, 116, 320/117; 363/20, 15, 37

(56) References Cited

U.S. PATENT DOCUMENTS

| 3,986,097 A | 10/1976 | Woods | ......................... 363/20 |
|---|---|---|---|
| 6,011,704 A | * 1/2000 | Coleman | ...................... 363/37 |
| 6,205,036 B1 | * 3/2001 | Anzawa | ........................ 363/20 |

* cited by examiner

*Primary Examiner*—Peter S. Wong
*Assistant Examiner*—Lawrence Luk
(74) *Attorney, Agent, or Firm*—Rosenthal & Osha L.L.P.

(57) ABSTRACT

In a voltage equalizing apparatus for battery devices, wherein each of a plurality of closed circuits is constituted of each of a plurality of battery devices interconnected in series on a secondary side, each of a plurality of secondary windings magnetically coupled with each other, and each of a plurality of switching devices on the secondary side, wherein a closed circuit is constituted of a battery device on a primary side, a primary winding magnetically coupled with the secondary windings in common, and a switching device on the primary side, and wherein
the plurality of switching devices on the secondary side and the switching device on the primary side are alternately switched ON and OFF, thereby equalizing the output voltages of the plurality of battery devices interconnected in series on the secondary side; the ON operation of the plurality of switching devices on the secondary side is continued until after the completion of release of exciting energy stored in a transformer.

18 Claims, 8 Drawing Sheets

VOLTAGE EQUALIZING APPARATUS AND VOLTAGE EQUALIZING METHOD FOR BATTERY DEVICES

BACKGROUND OF THE INVENTION

1. Field of the Invention

The present invention relates to an apparatus for performing energy transfer among a plurality of battery devices interconnected in series and carried on an electric car or a hybrid car and thereby equalizing each voltage across each of the plurality of battery devices interconnected in series.

2. Description of the Related Art

The related art in this field is disclosed, for example, in Japanese Laid-Open Patent Publication No. Hei 11-176483 and U.S. Pat. No. 5,003,244. In the configuration of the former patent as shown in FIG. 7, the output voltages E1 to En of a plurality of battery devices 1-1 to 1-n are interconnected in series. For the purpose of the balance correction of the output voltages of the plurality of battery devices, a switching transistor 2 connected to a primary coil Np in series is switched ON and OFF in response to the output voltages. A converter is composed of a plurality of secondary coils Ns each corresponding to each of the plurality of battery devices and wound on a common transformer core with the primary coil. The connection thereof is configured such that the secondary output of the converter charges each battery device. When the switching transistor 2 is periodically switched ON and OFF, a voltage depending on the turn number ratio is generated in each secondary coil Ns. Since the plurality of secondary coils are wound on the common core, the induced charging current concentrates in a battery device having the lowest voltage among the plurality of battery devices, whereby the plurality of battery devices are equalized in voltage.

In this former circuit, in addition to that the switching transistor is simply switched ON and OFF, the current Ip flowing in the primary coil Np is controlled depending on the load current Io.

Further, in the configuration of the latter patent as shown in FIG. 8, the output voltages of a plurality of battery devices 25, 26, 27, 28 are connected in series. For the purpose of the balance correction of the output voltages of the plurality of battery devices, a switching transistor 34 connected to a primary coil 16 in series is switched ON and OFF in response to the input from a power supply 30. A converter 14 is composed of a plurality of secondary coils 21, 22, 23, 24 each corresponding to each of the plurality of battery devices and wound on a common transformer core with the primary coil 16. The connection thereof is configured such that the secondary output of the converter 14 charges each battery device. When the switching transistor 34 is periodically switched ON and OFF, a voltage depending on the turn number ratio is generated in each secondary coil. Since the plurality of secondary coils are wound on the common core, the induced charging current concentrates in a battery device having the lowest voltage among the plurality of battery devices, whereby the plurality of battery devices are equalized in voltage.

There has been the following problems in such above-mentioned related art apparatuses for equalizing the voltages across each of a plurality of energy storage means (battery devices) interconnected in series by means of the switching of a converter.

(a) In each above-mentioned related art apparatus, the magnetizing force is one directional in the transformer core for the ON and OFF duration of the switching device (transistor). Accordingly, the range of the change in magnetic flux density of the core is small, and hence the utilization of the core is less efficient. The lower efficiency in core utilization implies the necessity of a larger cross section in the core for a specific output power, thereby causing the problems of a larger apparatus and a higher cost.

Further, the switching ON and OFF of the switching device for the voltage equalizing causes a problem that electric charge stored in the capacitance existing between the terminals of the switching device for the OFF duration of the switching device is discharged by the next ON operation thereby to cause a power loss and a noise due to the short-circuit current.

(b) In each above-mentioned related art apparatus, energy stored in the transformer for the ON duration of the switching device is discharged for the next OFF duration of the switching device, thereby charging a battery device having the lowest voltage among the plurality of battery devices thereby to equalize the output voltages of the plurality of battery devices. Accordingly, the amount of equalizing energy is only the amount of energy stored for the ON duration of the switching device. Therefore, in order to increase the equalizing action, a larger switching device is necessary for increasing the equalizing current. However, this larger switching device causes a larger apparatus and hence a higher cost, as is the above-mentioned case (a). Further, since each battery device has an internal resistance, the higher current from the switching device causes a larger voltage drop across the internal resistance, thereby increasing apparent output voltage of the battery device in charging. This causes a problem of reducing the precision of output voltage equalizing.

SUMMARY OF THE INVENTION

An object of the present invention is to resolve the above-mentioned disadvantages (a) and (b) thereby to provide a voltage equalizing apparatus having a high efficiency and a high precision of equalizing and being of a small size.

In order to resolve the above-mentioned problems, in a voltage equalizing apparatus for battery devices, wherein each of a plurality of closed circuits is constituted of each of a plurality of battery devices (1-1 to 1-n) interconnected in series on a secondary side, each of a plurality of secondary windings (4-1 to 4-n) magnetically coupled with each other in a transformer (3), and each of a plurality of switching devices (2-1 to 2-n) on the secondary side, wherein a closed circuit is constituted of a battery device (1-m) on a primary side, a primary winding (4-m) magnetically coupled with the secondary windings in common, and a switching device (2-m) on the primary side, and wherein the plurality of switching devices on the secondary side and the switching device on the primary side are alternately switched ON and OFF, thereby equalizing the output voltages of the plurality of battery devices (1-1 to 1-n) interconnected in series on the secondary side; the ON operation of the plurality of switching devices (2-1 to 2-n) on the secondary side is continued until after the completion of release of exciting energy stored in the transformer by an ON operation of the switching device (2-m) on the primary side, into the plurality of battery devices on the secondary side through the plurality of switching devices (2-1 to 2-n) on the secondary side, whereby the above-mentioned object is achieved.

Further, means for detecting the variation in the output voltages of the plurality of battery devices (1-1 to 1-n) interconnected in series on the secondary side is provided, whereby in case of a large variation, the ON duration of the switching device (2-m) on the primary side and/or the plurality of switching devices (2-1 to 2-n) on the secondary side is extended.

In case of a small variation in the output voltages of the plurality of battery devices interconnected in series on the secondary side, the ON/OFF operation of the switching devices on the first and primary sides is stopped, and/or the ON duration of the switching devices on the first and primary sides is extremely shortened. This avoids power loss and noise due to unnecessary voltage equalizing operation in case of the small variation in the output voltages.

In case that the variation in the output voltages of the plurality of battery devices interconnected in series on the secondary side becomes smaller than a predetermined value, the ON duration of the switching device on the first and/or of the switching devices on the primary sides is shortened for reducing a equalizing current flowing among the first battery devices, whereby the precision increases in equalizing the terminal voltages of the battery devices.

In case that a current greater than or equal to a predetermined value flows through the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is substantially stopped when the cell voltage detection of each battery device is affected by a voltage drop generated across the internal resistance of the battery device by a high current flowing through the plurality of battery devices interconnected in series on the secondary side.

During the charge from an external power supply and the discharge to an external load by the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is stopped, even without current detection, automatically in response to the operation of a switch (S11) for switching the charge and discharge modes.

When the plurality of switching devices on the secondary side and the switching device on the primary side are alternately switched ON and OFF, there is a pause in an interval from the switching-OFF of the plurality of switching devices on the secondary side to the switching-ON of the switching device on the primary side and in an interval from the switching-OFF of the switching device on the primary side to the switching-ON of the plurality of switching devices on the secondary side, whereby each switch can be switched ON under the condition of substantially no electric charge in the capacitance component between the terminals of the switch in question (zero-volt switching).

A plurality of modules, wherein in each of the plurality of modules, each of a plurality of closed circuits is constituted of each of a plurality of battery devices interconnected in series on a secondary side, each of a plurality of secondary windings magnetically coupled with each other, and each of a plurality of switching devices on the secondary side, and wherein each of the plurality of modules comprises a transformer having at least a module equalizing winding magnetically coupled with the plurality of secondary windings in common, are provided; and the module equalizing windings each provided in each of the plurality of modules are interconnected in parallel; at least one of the plurality of modules is provided with an exciting winding magnetically coupled with the plurality of secondary windings involved in the module in question; a closed circuit is constituted by the serial connection of the exciting winding, a battery device on a primary side, and a switching device on the primary side; the ON operation of the plurality of switching devices on the secondary side is continued until after the completion of release of exciting energy stored in the transformer by an ON operation of the switching device on the primary side, into the plurality of battery devices on the secondary side through the plurality of switching devices on the secondary side; where by voltage equalizing operation similar to that within each single module is achieved also among the plurality of modules, whereby overall voltage equalizing operation is obtained.

Accordingly, there is a further effect that a necessary output voltage can be obtained by an appropriate combination of single modules.

The combination use of the exciting winding and the module equalizing winding permits a miniaturization of the apparatus.

In a voltage equalizing method for battery devices, wherein each of a plurality of closed circuits is constituted of each of a plurality of battery devices (1-1 to 1-n) interconnected in series on a secondary side, each of a plurality of secondary windings (4-1 to 4-n) magnetically coupled with each other in a transformer (3), and each of a plurality of switching devices (2-1 to 2-n) on the secondary side, wherein a closed circuit is constituted of a battery device (1-m) on a primary side, a primary winding (4-m) magnetically coupled with the secondary windings in common, and a switching device (2-m) on the primary side, and wherein the plurality of switching devices on the secondary side and the switching device on the primary side are alternately switched ON and OFF, thereby equalizing the output voltages of the plurality of battery devices interconnected in series on the secondary side; the ON operation of the plurality of switching devices (2-1 to 2-n) on the secondary side is continued until after the completion of release of exciting energy stored in the transformer by an ON operation of the switching device (2-m) on the primary side, into the plurality of battery devices on the secondary side through the plurality of switching devices (2-1 to 2-n) on the secondary side, whereby the above-mentioned object is achieved.

The ON duration of the switching device (2-m) on the primary side is controlled depending on the variation in the output voltages of the plurality of battery devices interconnected in series on the secondary side, whereby the voltage equalizing is performed more effectively depending on the value of the variation.

Means for detecting the variation in the output voltages of the plurality of battery devices (1-1 to 1-n) interconnected in series on the secondary side is provided, whereby in case of a large variation, the ON duration of the switching device (2-m) on the primary side and/or the plurality of switching devices (2-1 to 2-n) on the secondary side is extended.

In case that the variation in the output voltages of the plurality of battery devices interconnected in series on the secondary side becomes smaller than a predetermined value, the ON duration of the switching device on the first and/or of the switching devices on the primary sides is shortened for the reduction of power consumption for the equalizing, whereby the precision increases in equalizing the terminal voltages of the battery devices.

In case of a small variation in the output voltages of the plurality of battery devices interconnected in series on the secondary side, the ON/OFF operation of the switching devices on the first and primary sides is stopped, and/or the ON duration of the switching devices on the first and primary sides is extremely shortened. This avoids power loss and noise due to unnecessary voltage equalizing operation in case of the small variation in the output voltages.

In case that a current greater than or equal to a predetermined value flows through the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is substantially stopped when the cell voltage detection of each battery device is affected by a voltage drop generated across the internal resistance of the battery device by a high current flowing through the plurality of battery devices interconnected in series on the secondary side.

During the charge from an external power supply and the discharge to an external load by the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is stopped, even without current detection, automatically in response to the operation of a switch (S11) for switching the charge and discharge modes.

When the plurality of switching devices on the secondary side and the switching device on the primary side are alternately switched ON and OFF, there is a pause in an interval from the switching-OFF of the plurality of switching devices on the secondary side to the switching-ON of the switching device on the primary side and in an interval from the switching-OFF of the switching device on the primary side to the switching-ON of the plurality of switching devices on the secondary side, whereby each switch can be switched ON under the condition of substantially no electric charge in the capacitance component between the terminals of the switch in question (zero-volt switching).

DETAILED DESCRIPTION OF THE PRESENT INVENTION

A first embodiment of the present invention is described below with reference to FIG. 1.

Figure 1:
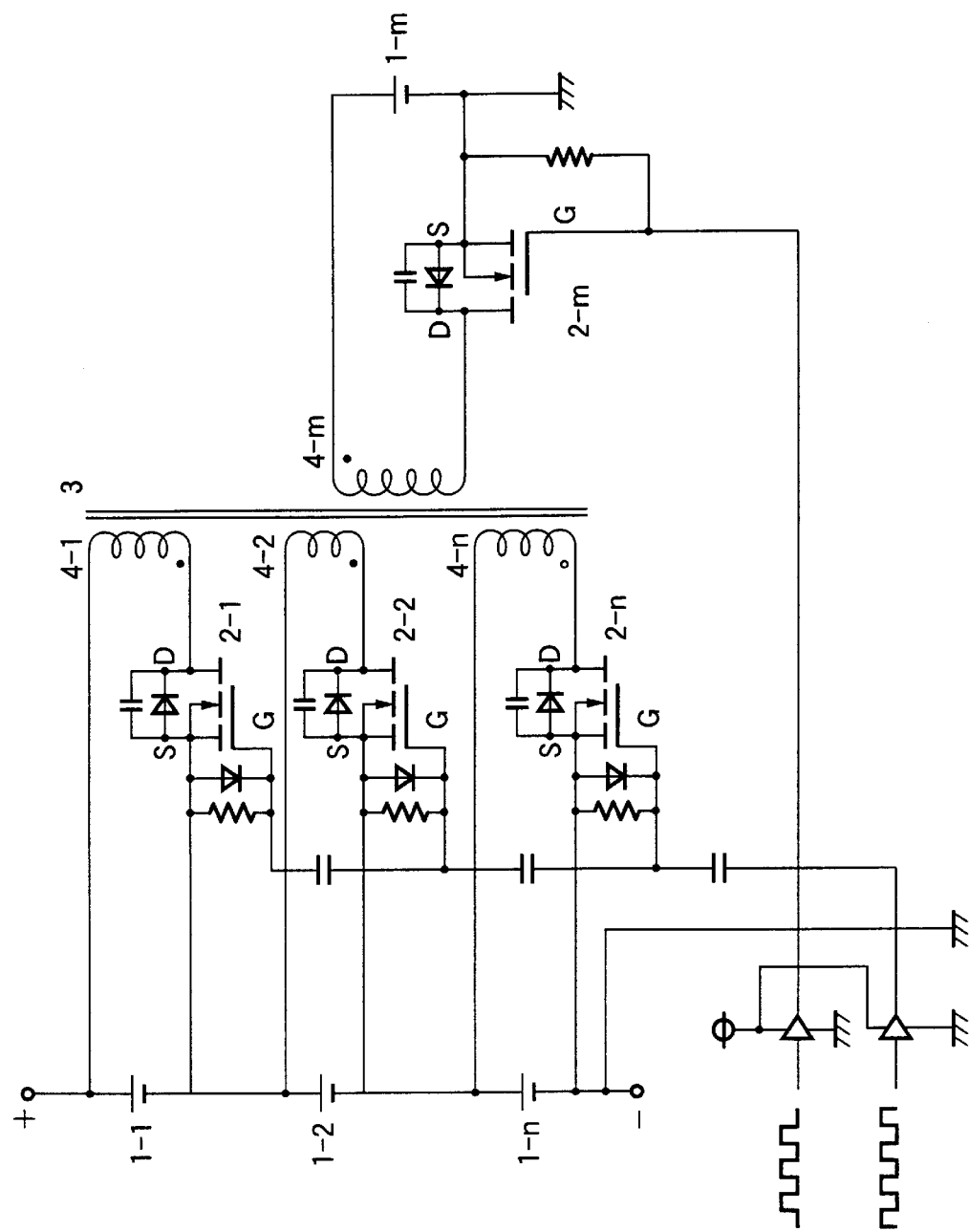
FIG. 1 is a diagram showing a voltage equalizing apparatus for battery devices in accordance with a first embodiment of the present invention.

FIG. 1 shows a basic circuit of the present invention. Numerals 1-1 to 1-n designate a plurality of battery devices interconnected in series. Numerals 2-1 to 2-n designates a plurality of switching devices on a secondary side. Numeral 1-m is a battery device provided separately from the plurality of battery devices, and may be in combination with a direct-current power supply, a charger, or a generator. Numeral 2-m is a switching device on a primary side for conducting a current from the battery device 1-m to a primary winding 4-m wound on a common core of a transformer 3. The common core of the transformer 3 is further provided with a plurality of secondary windings 4-1 to 4-n for providing charging currents into the plurality of battery devices 1-1 to 1-n interconnected in series.

The switching device 2-m and the switching devices 2-1 to 2-n are provided with pulses in opposite polarity as shown in FIG. 1. Accordingly, the conduction thereof is controlled such that the switching devices 2-1 to 2-n are OFF when the switching device 2-m is ON and that the switching devices 2-1 to 2-n are ON when the switching device 2-m is OFF.

Next, the operation of the circuit shown in FIG. 1 is described below with reference to FIG. 2.

Figure 2:
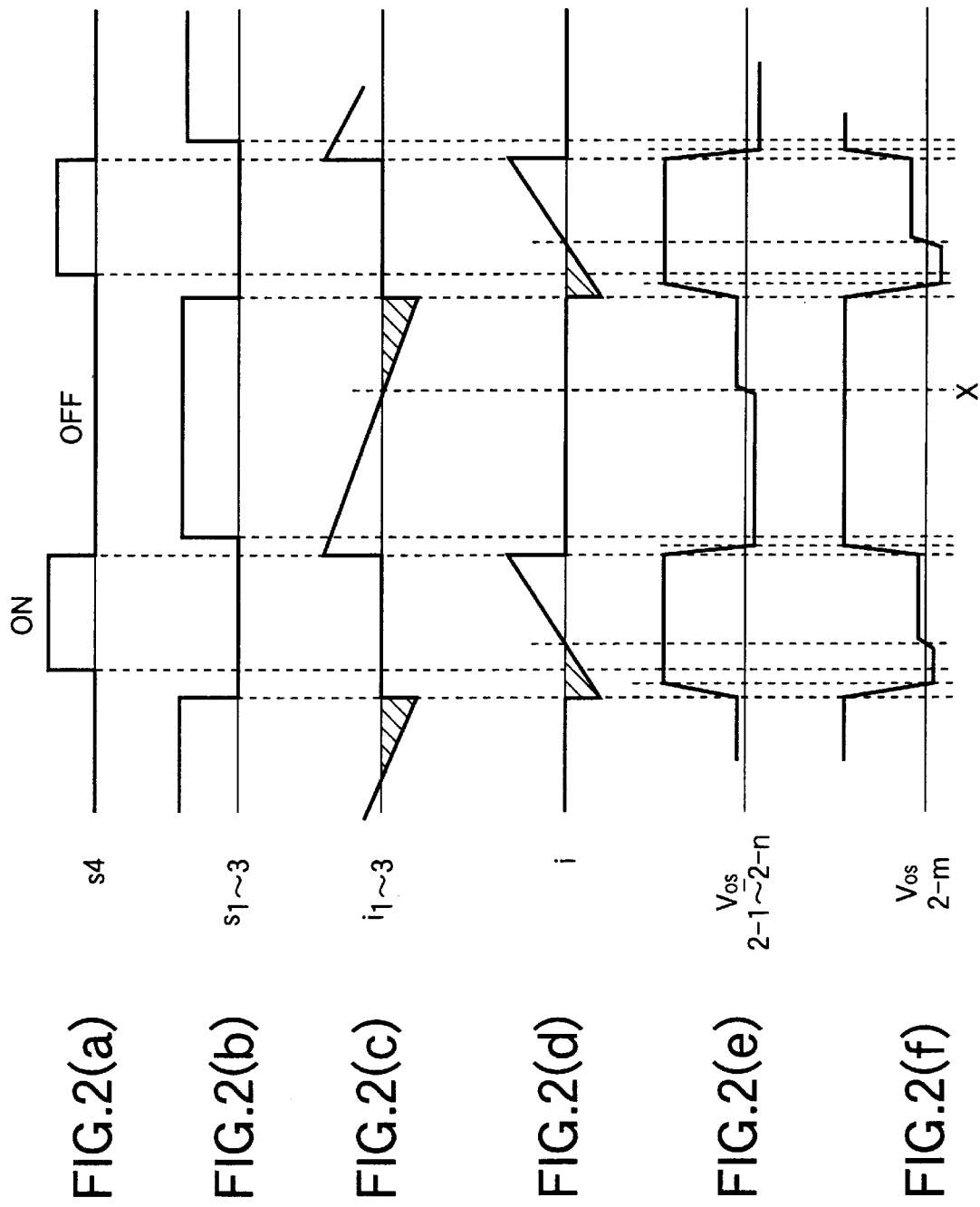
FIG. 2 is a diagram showing the operation of a voltage equalizing apparatus for battery devices in accordance with a first embodiment of the present invention.

In FIG. 2, part (a) shows the ON and OFF duration of the switching device 2-m. Part (b) shows the ON and OFF duration of the switching devices 2-1 to 2-n on the primary side. Part (c) shows charging and discharging currents for the voltage equalizing of the battery devices 1-1 to 1-n. These currents flow through the secondary windings 4-1 to 4-n. (These currents are different from a charging current from an external charger and a discharging current to an external load supplied to and from the plurality of battery devices interconnected in series.) Part (d) shows a current flowing through the primary winding 4-m. This current supplies equalizing energy stored in the transformer 3.

A feature of the present invention in the above-mentioned operation is the point that the ON duration of the switching device 2-m on the primary side is different from the ON duration of the switching devices 2-1 to 2-n on the secondary side and that, more specifically, the ON duration of the switching devices 2-1 to 2-n on the secondary side is set to be longer than the ON duration of the switching device 2-m on the primary side, whereby the voltage variation of the plurality of battery devices interconnected in series is reduced in comparison with the related art.

As described above, the ON duration of the switching device 2-m on the primary side and the ON duration of the switching devices 2-1 to 2-n on the secondary side are set to be different from each other, and the ON duration of the switching devices 2-1 to 2-n on the secondary side is set to be longer than the other.

The feature that the ON duration of the switching device 2-m on the primary side and the ON duration of the switching devices 2-1 to 2-n on the secondary side are set to be different from each other and that the ON duration of the switching devices 2-1 to 2-n on the secondary side is set to be longer than the other causes not merely the difference in time duration but also the result that the ON operation of the plurality of switching devices on the secondary side is continued until after the completion of release of exciting energy stored in the transformer by an ON operation of the switching device on the primary side, into the plurality of battery devices on the secondary side through the plurality of switching devices on the secondary side.

Figure 6:
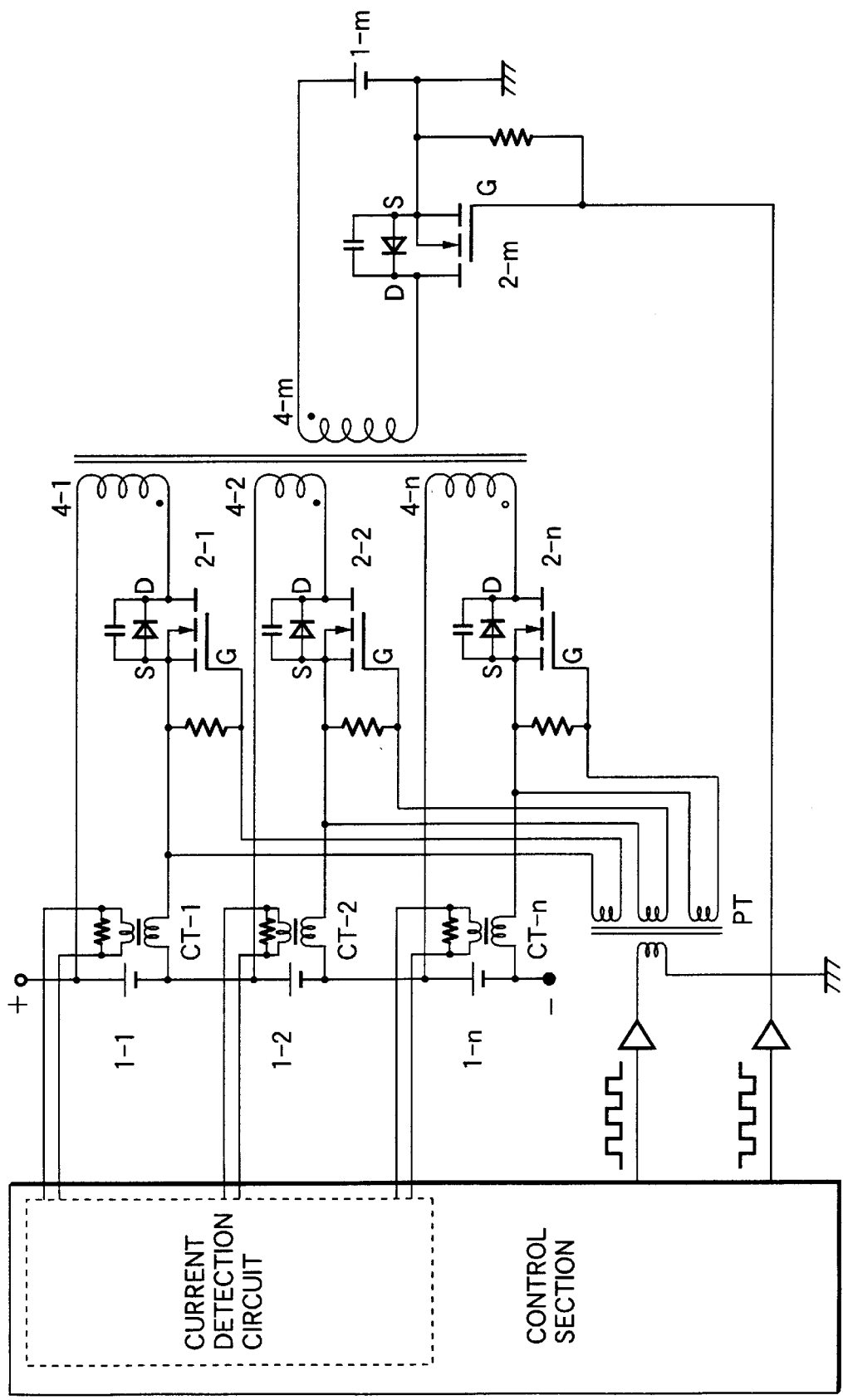
FIG. 6 is a diagram showing a circuit for detecting the timing of completion of the release of the exciting energy of a transformer.

In order to detect the completion of release of exciting energy stored in the transformer by an ON operation of the switching device on the primary side into the plurality of battery devices on the secondary side through the plurality of switching devices on the secondary side, a current transformer CT-1 to CT-n as current detecting means is provided in each closed circuit constituted of each battery device 1-1 to 1-n, each secondary winding 4-1 to 4-n, and each switching device 2-1 to 2-n, as shown in FIG. 6. Then, by detecting the timing of the polarity inversion of the output of each transformer, the timing of the completion of the release of exciting energy in the transformer 3 can be detected. Here, a resistor may be used instead of each current transformer shown herein. Further, a pulse transformer PT may be used for driving the plurality of switching devices 2-1 to 2-n, as shown in FIG. 6.

Furthermore, the timing of the completion of the release of exciting energy in the transformer 3 can be detected by a signal operation on the terminal voltage of the battery devices on the secondary side, exciting energy in the transformer, or the like.

Described below is a discussion that the voltage equalizing among the battery devices can be realized without an increase in apparatus size.

A current from the battery device 1-m flows into the winding 4-m for the ON duration of the switching device 2-m on the primary side, whereby an amount of energy is stored in the transformer 3 by a current portion not shaded in FIG. 2(d).

FIG. 2(f) shows the change in the voltage Vds across the switching device 2-m before and after the ON transition of the switching device 2-m.

When the switching devices 2-1 to 2-n go OFF, the electric charge stored in a capacitance component (parasitic capacitance and an external capacitor) across the switching device 2-m is discharged through a parasitic diode involved in the switching device 2-m, whereby the voltage Vds across the switching device 2-m falls to about zero (approximately equal to the normal direction voltage of the diode) for the pause duration until the ON transition of the switching device 2-m.

When the ON state of the switching devices 2-1 to 2-n is continued after the release of exciting energy in the transformer, the direction of the current flowing each closed circuit becomes reversed, and a current begins to flow, in turn, from each switching device 2-1 to 2-n to each winding 4-1 to 4-n (shaded part in FIG. 2(c)). The reversed current excites the transformer, and transfers energy from a battery device having a higher terminal voltage to a battery device having a lower terminal voltage.

At that time, the voltage across each switching device 2-1 to 2-n changes as shown in FIG. 2(e).

When the switching devices (FET's) 2-1 to 2-n go OFF, the exciting energy stored by a portion of the reversed current is released to the primary winding. This released current draws the electric charge stored in the capacitance component (including an external capacitor) across the Vds of the switching device (FET) 2-m. After that, the Vds is clamped to the normal direction voltage (about 0.5 V) for the duration when a normal direction current flows in the parasitic diode of the FET.

Therefore, for the almost entire duration shown by a shadow in the waveform shown in FIG. 2(d), a current is flowing in the parasitic diode. Accordingly, if the switching device 2-m is switched ON within the duration, the Vds is almost zero, and hence zero-volt switching can be achieved. The zero-volt switching reduces the switching power loss and the noise at switching ON.

The description above has been made for the switching device 2-m. However, the situation is similar also for the switching devices 2-1 to 2-n (FIG. 2(e)).

Then, the switching device 2-m goes OFF and the switching devices 2-1 to 2-n go ON. In this situation, each battery device 1-1 to 1-n is ready for charge by the voltage across each winding 4-1 to 4-n induced by the energy stored in the transformer 3 for the ON duration of the switching device 2-m.

However, every battery device 1-1 to 1-n is not equally charged by the induced voltage across each winding 4-1 to 4-n.

Figure 7:
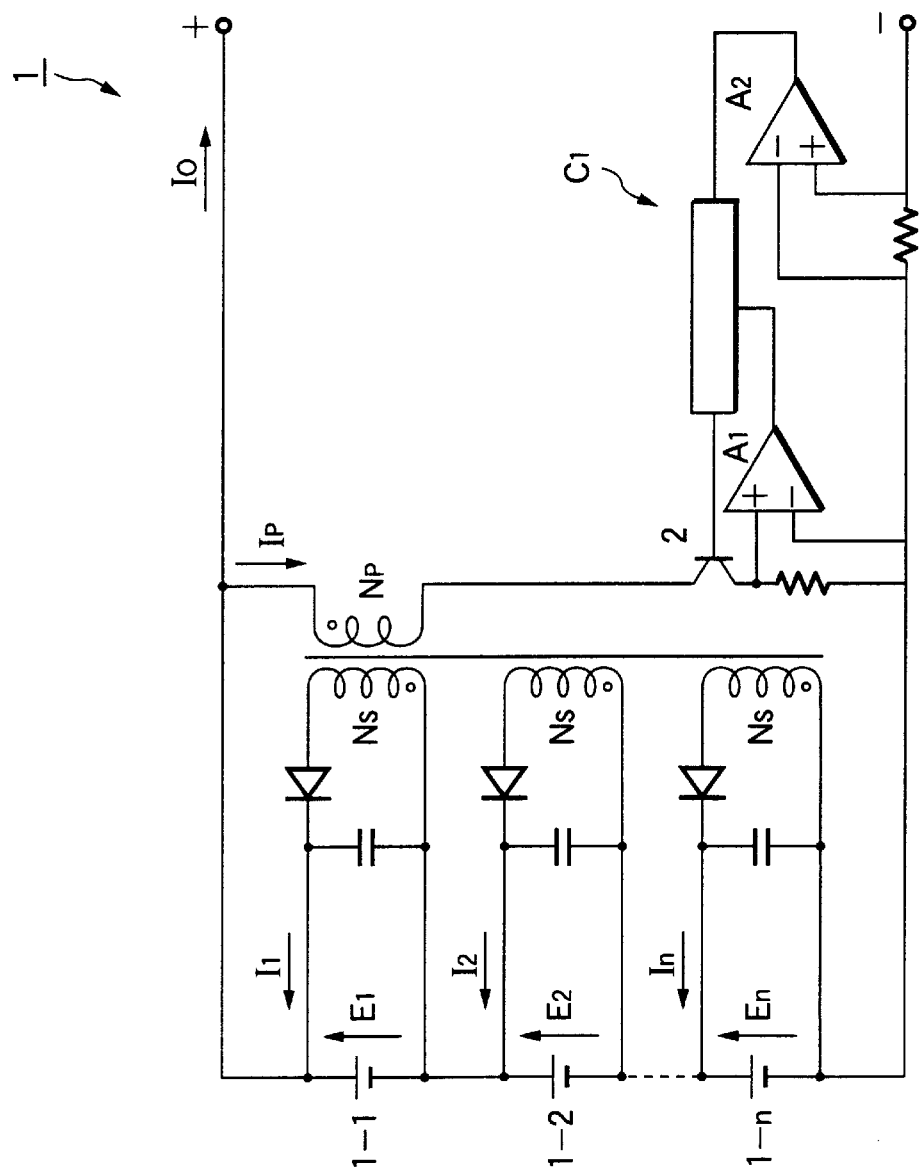
FIG. 7 is a diagram showing a voltage equalizing apparatus for battery devices in accordance with a first related art.
Figure 8:
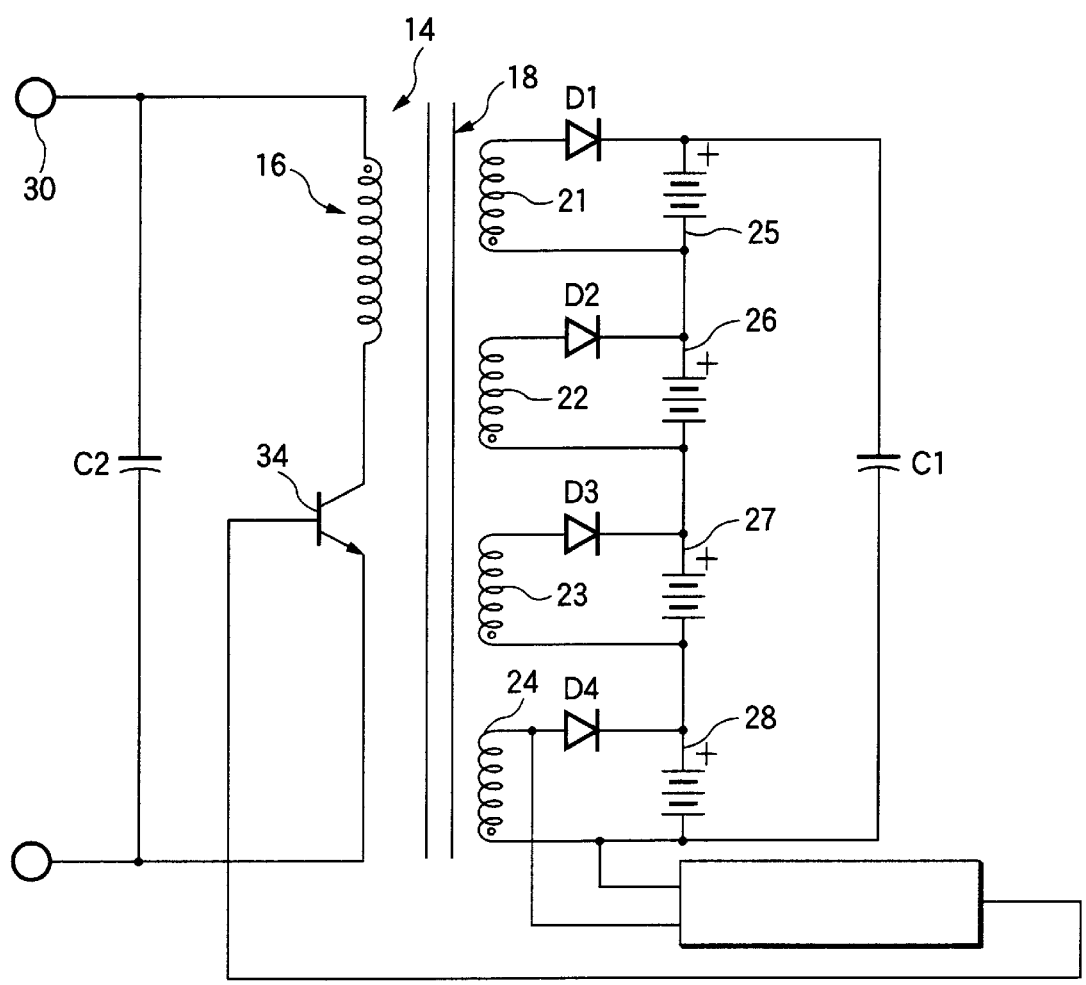
FIG. 8 is a diagram showing a voltage equalizing apparatus for battery devices in accordance with a second related art.

When there is a variation in the output voltages of the plurality of battery devices 1-1 to 1-n interconnected in series, the current of the portion not shadowed in FIG. 2(c) concentrates in a battery device having the lowest voltage among the plurality of battery devices interconnected in series. This charging current increases the voltage of the battery device having the lowest voltage among the plurality of battery devices interconnected in series. Such an operation is repeated, thereby equalizing the voltages of the plurality of battery devices interconnected in series. (The situation is the same as that of the voltage equalizing operation by the related art circuits shown in FIGS. 6 and 7.)

As described above, in the present invention, even after the concentrated release of the energy stored in the transformer 3 f for the ON duration of the switching device 2-m into the battery device having the lowest voltage (after the timing indicated by a broken line X in FIG. 2), the switching devices 2-1 to 2-n remain ON.

If there is a variation in the output voltages of the plurality of battery devices 1-1 to 1-n interconnected in series still at the timing X of the concentrated release of the energy stored in the transformer 3 f for the ON duration of the switching device 2-m into the battery device having the lowest voltage, discharging occurs from a battery device having the highest voltage among the plurality of battery devices interconnected in series. This is because the switching devices 2-1 to 2-n are ON. The discharging current is indicated by shadow portion in FIG. 2(c).

As such, energy is stored in the transformer 3 by the current indicated by shadow portion in FIG. 2(c) from a battery device having the highest voltage among the plurality of battery devices interconnected in series. Further, energy is transferred from a battery device having the highest voltage to a battery device having the lowest voltage.

The energy stored in the transformer 3 is released as a charging current (shadow portion in FIG. 2(d)) flowing into the battery device 1-m after the switching devices 2-1 to 2-n go OFF. (For this duration, the switching device 2-m does not go ON yet. However, the switching device 2-m is provided with a diode connected in the direction permitting the battery device 1-m. Thus, charging is possible.)

Figure 3:
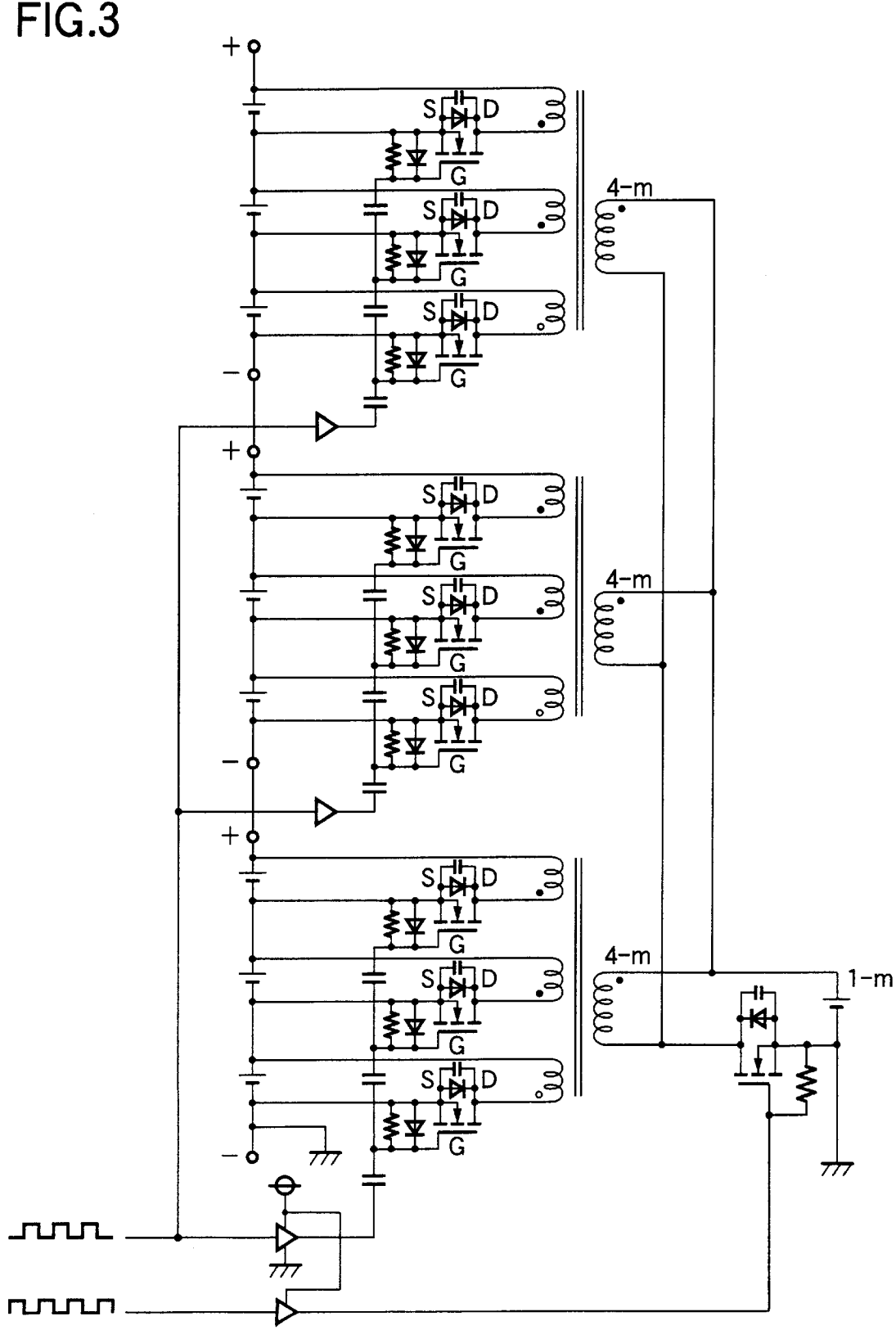
FIG. 3 is a diagram showing a voltage equalizing apparatus for battery devices in accordance with a second embodiment of the present invention.

When an FET is used for the switching device as shown in FIGS. 1 and 3, the parasitic diode thereof caused by a fabrication process is used for the above-mentioned diode.

In case of using a switching device, such as a mechanical switching device and a transistor switch, without such a parasitic diode, a diode for charging for OFF duration of the switching device is necessarily connected in parallel to the switching device.

As such, for the ON duration of the switching devices 2-1 to 2-n, a battery device having the lowest voltage among the plurality of battery devices 1-1 to 1-n interconnected in series is charged by the energy stored from the battery device 1-m for the ON duration of the switching device 2-m. Further, for the ON duration of the switching devices 2-1 to 2-n, energy is transferred from a battery device having the highest voltage among the plurality of battery devices 1-1 to 1-n interconnected in series through the windings 4-1 to 4-n of the transformer 3 to a battery device having the lowest voltage. At that time, energy is stored in the transformer 3. The energy is then released from the transformer 3 thereby to charge the battery device 1-m for the OFF duration of the switching devices 2-1 to 2-n.

As such, even when there is a variation in the output voltages of the plurality of battery devices interconnected in series, the control is carried out such that a battery device having a lower voltage is charged and that a battery device having a higher voltage is discharging. Accordingly, the equalizing of the voltages of the plurality of battery devices is enhanced in comparison with the related art.

Such equalizing operation can perform equalization to an extent (for example, 20 mV), however, the variation is not improved further.

This is because a high current is supplied (the ON duration of the switching device on the primary side and/or the switching devices on the secondary side is long) in each closed circuit in order to achieve the voltage equalizing as rapid as possible in the initial state having a large unbalance.

When such a high current flows through a line resistance, the ON resistance of an FET, the resistance in a transformer winding, and the like, a voltage drop occurs and is added to the terminal voltage of each switching device. This added voltage appears across each secondary winding. Therefore, if an added voltage coincides with another added voltage, the equalizing does not proceed between these battery devices even when there is an actual voltage difference.

That is, the equalizing of the terminal voltages of the battery devices is obstructed by the "difference in generated voltage" due to a variation in line resistance, ON resistance of an FET, resistance in a transformer winding, and the like existing in each closed circuit on the secondary side.

A method for resolving this problem is to reduce the circuit current during the equalizing, thereby reducing the "difference in generated voltage" (that is, to shorten the ON duration of the switching device on the primary side and/or the switching devices on the secondary side).

Therefore, the method of shortening the ON duration of the switching device on the primary side and/or the switching devices on the secondary side thereby to reduce the equalizing currents when the variation becomes somewhat small is effective for improving the precision of the equalizing of the terminal voltages of the battery devices.

A second embodiment of the present invention is described below with reference to FIG. 3.

In FIG. 3, the basic circuit of the present invention shown in FIG. 1 is treated as a single module. A plurality of such modules (three modules in FIG. 3) are provided, and a plurality of battery devices in respective modules are interconnected in series. However, a battery device 1-m and a pulse supplying circuit for switching ON and OFF each switching device are used in common.

Figure 4:
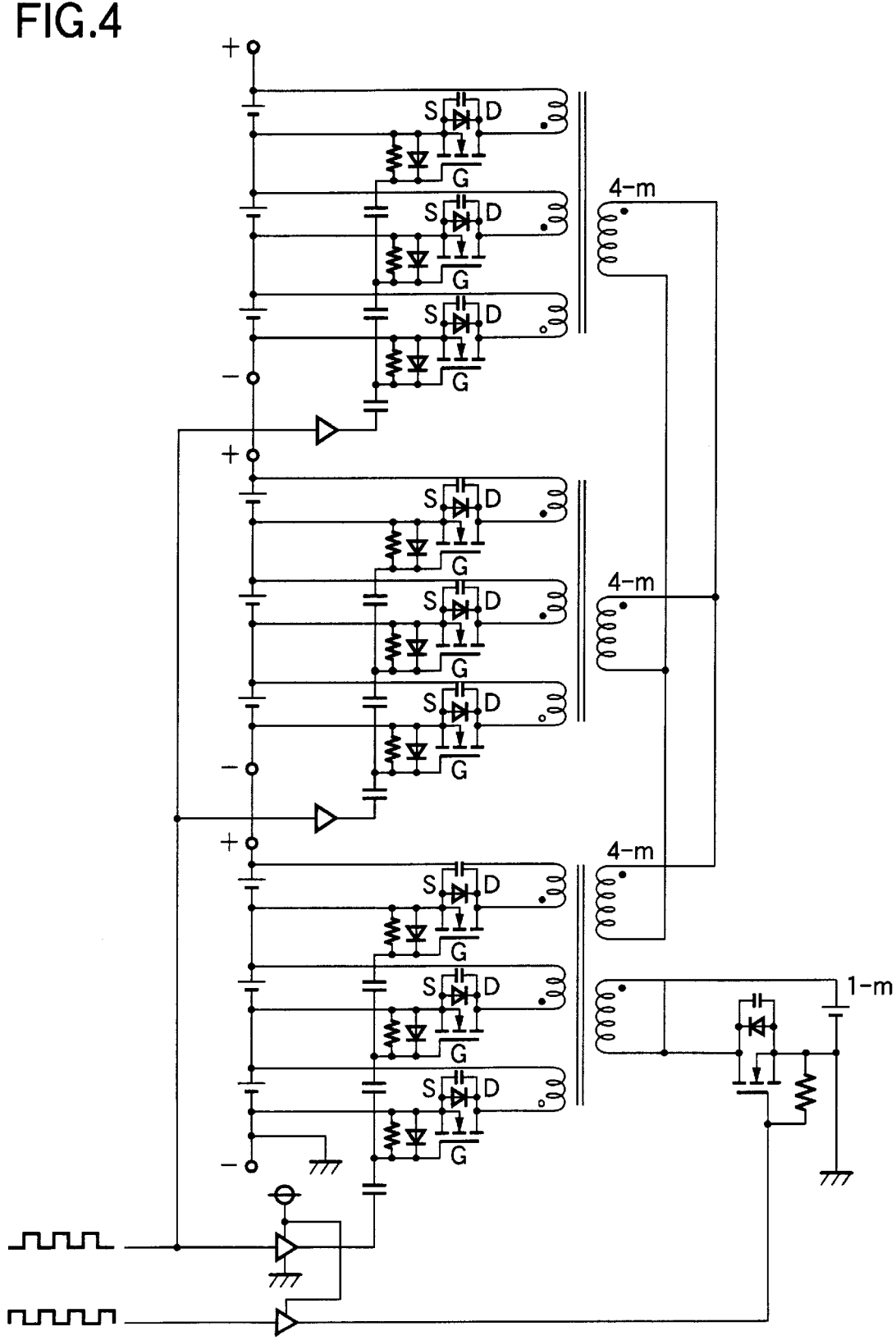
FIG. 4 is a diagram showing a voltage equalizing apparatus for battery devices in accordance with a modification of a second embodiment of the present invention.

Further, in FIG. 3, a module equalizing winding 4-m is common with an exciting winding from a battery device 1-m. However, the exciting winding and the module equalizing winding may be separate as shown in FIG. 4.

The operation of the second embodiment is basically the same as that of the first embodiment. However, voltage equalizing occurs also among the plurality of modules similarly to that within a single module, whereby overall voltage equalizing is achieved.

This configuration has a further effect that a required output voltage can be obtained by an appropriate combination of a plurality of single modules.

In the second embodiment of FIG. 3, a battery device on the primary side, a primary winding, and a switching device on the primary side are provided separately from the plurality of modules interconnected in series. However, those components may be replaced by a module among the plurality of modules interconnected in series.

Figure 5:
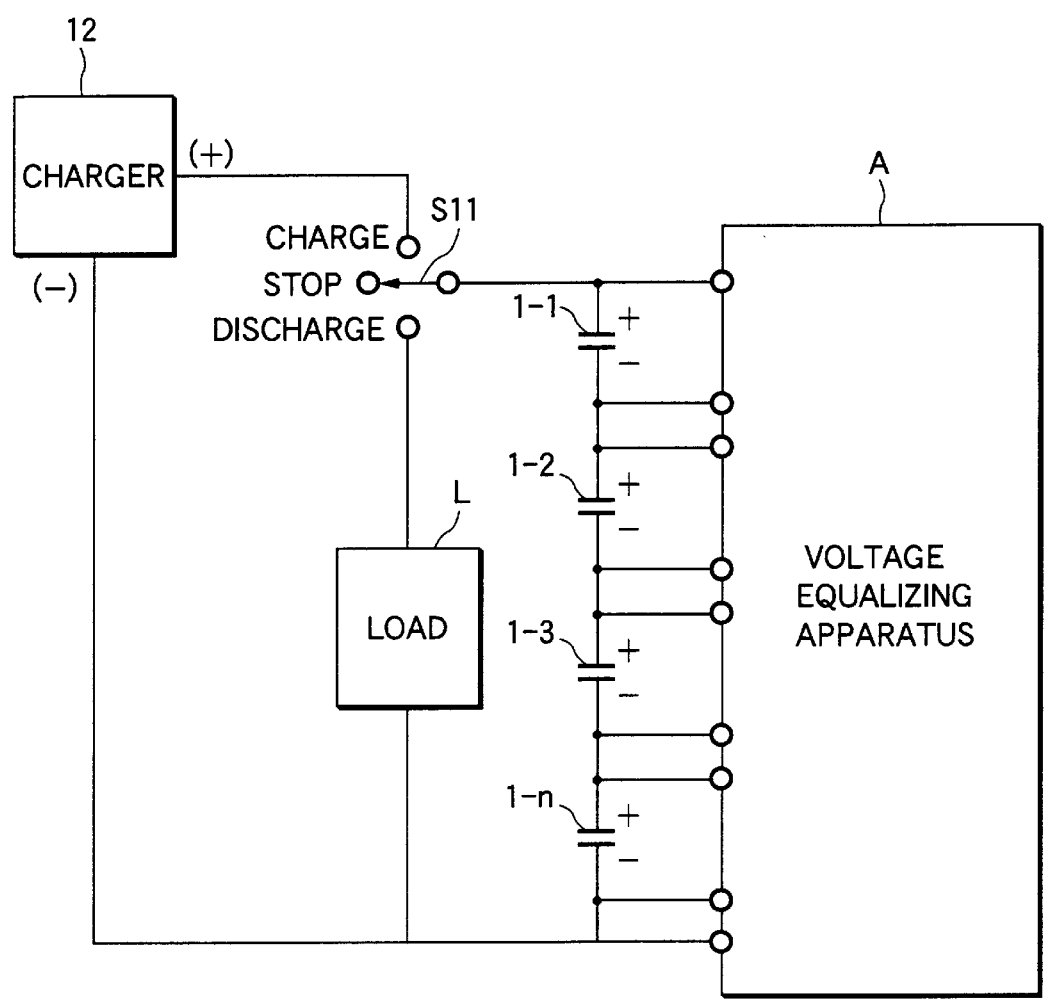
FIG. 5 is a diagram showing the relation between a voltage equalizing apparatus for battery devices and both an external power supply and a load.

FIG. 5 shows the usage of a voltage equalizing apparatus for battery devices in accordance with the present invention. In FIG. 5 Numerals 1-1 to 1-n are plurality of battery devices interconnected in series. Numeral A is a voltage equalizing apparatus. Numeral 12 is an external charger. Numeral L is a load. Numeral S11 is a switch.

In case that a plurality of battery devices interconnected in series are used as a driving cell for an electric car, the load is an electric motor for driving the car. With the switch S11 setting to charging mode, the charger performs charging by using electric power generated by a generator during the running of the car by gasoline motor. During the running by driving cell, the switch S11 is set to discharging mode to drive the electric motor.

As such, when a voltage equalizing apparatus (method) for battery devices in accordance with the present invention is applied to a hybrid car using the combination of a gasoline motor and an electric motor and an electric car using an electric motor alone, the output voltages are equalized among a plurality of battery devices interconnected in series necessary for driving the electric motor for running, whereby the output power of the cell is used efficiently. Therefore, the emission of carbon dioxide and the like is reduced, which contributes to the protection of global environment.

During the charge from the charger and the discharge to the load by the plurality of battery devices interconnected in series, a large current flows in each of the plurality of battery devices interconnected in series. The large current causes a large voltage drop across the internal resistance of each battery device, thereby affecting the voltage detection of each battery device. Therefor, the voltage equalizing operation by the voltage equalizing apparatus is preferably stopped for such duration.

In FIGS. 1 and 3, a switching device of FET is used. However, a switching device of the present invention is not restricted to an FET. That is, another switching device, such as a transistor and a thyristor, may be used. When a transistor and the like is used, a diode for flowing a current in the reverse direction for the OFF duration of the switching device is preferably connected in parallel.

A battery device may by a battery cell, such as a lead-acid battery, a nickel-hydrogen cell, a lithium ion cell, and a polymer lithium cell. Further, a battery device may be an electrical double layer capacitor. The type of each battery device 1-1 to 1-n interconnected in series may be the same as or different from that of the battery device 1-m.

A plurality of battery devices 1-1 to 1-n interconnected in series may be used also as a battery device on the primary side.

In accordance with the invention, in a voltage equalizing apparatus for battery devices, wherein each of a plurality of closed circuits is constituted of each of a plurality of battery devices (1-1 to 1-n) interconnected in series on a secondary side, each of a plurality of secondary windings (4-1 to 4-n) magnetically coupled with each other in a transformer (3), and each of a plurality of switching devices (2-1 to 2-n) on the secondary side, wherein a closed circuit is constituted of a battery device (1-m) on a primary side, a primary winding (4-m) magnetically coupled with the secondary windings in common, and a switching device (2-m) on the primary side, and wherein the plurality of switching devices on the secondary side and the switching device on the primary side are alternately switched ON and OFF, thereby equalizing the output voltages of the plurality of battery devices (1-1 to 1-n) interconnected in series on the secondary side; the ON operation of the plurality of switching devices (2-1 to 2-n) on the secondary side is continued until after the completion of release of exciting energy stored in the transformer by an ON operation of the switching device (2-m) on the primary side, into the plurality of battery devices on the secondary side through the plurality of switching devices (2-1 to 2-n) on the secondary side, whereby the voltage equalizing operation is improved in comparison with the related art.

In accordance with an invention, means for detecting the variation in the output voltages of the plurality of battery devices (1-1 to 1-n) interconnected in series on the secondary side is provided, whereby in case of a large variation, the ON duration of the switching device (2-m) on the primary side and/or the plurality of switching devices (2-1 to 2-n) on the secondary side is extended, whereby the voltage equalizing operation is achieved with a minimum power loss.

In accordance with an invention, in case of a small variation in the output voltages of the plurality of battery devices interconnected in series on the secondary side, the ON/OFF operation of the switching devices on the first and primary sides is stopped, and/or the ON duration of the switching devices on the first and primary sides is extremely shortened. This avoids power loss and noise due to unnecessary voltage equalizing operation in case of the small variation in the output voltages.

In accordance with an invention, in case that the variation in the output voltages of the plurality of battery devices interconnected in series on the secondary side becomes smaller than a predetermined value, the ON duration of the switching device on the first and/or of the switching devices on the primary sides is shortened for the reduction of power consumption for the equalizing after the equalizing has been achieved to an extent (for example, 20 mV), whereby the precision increases in equalizing the terminal voltages of the battery devices because of the reduced equalizing current.

In accordance with an invention, in case that a current greater than or equal to a predetermined value flows through the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is substantially stopped when the cell voltage detection of each battery device is affected by a voltage drop generated across the internal resistance of the battery device by a high current flowing through the plurality of battery devices interconnected in series on the secondary side, whereby a problem can be avoided even when the high current flows.

In accordance with an invention, during the charge from an external power supply and the discharge to an external load by the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation can be stopped, even without current detection, automatically in response to the operation of a switch (S11) for switching the charge and discharge modes.

In accordance with the invention, when the plurality of switching devices on the secondary side and the switching device on the primary side are alternately switched ON and OFF, there is a pause in an interval from the switching-OFF of the plurality of switching devices on the secondary side to the switching-ON of the switching device on the primary side and in an interval from the switching-OFF of the switching device on the primary side to the switching-ON of the plurality of switching devices on the secondary side, whereby each switch can be switched ON under the condition of substantially no electric charge in the capacitance component between the terminals of the switch in question (zero-volt switching). This resolves a problem that the switching ON and OFF of the switching device for the voltage equalizing causes a trouble that electric charge stored in the capacitance existing between the terminals of the switching device for the OFF duration of the switching device is discharged by the next ON operation thereby to cause a power loss and a noise due to the short-circuit current.

In accordance with an invention, a plurality of modules, wherein in each of the plurality of modules, each of a plurality of closed circuits is constituted of each of a plurality of battery devices interconnected in series on a secondary side, each of a plurality of secondary windings magnetically coupled with each other, and each of a plurality of switching devices on the secondary side, and wherein each of the plurality of modules comprises a transformer having at least a module equalizing winding magnetically coupled with the plurality of secondary windings in common, are provided; and the module equalizing windings each provided in each of the plurality of modules are interconnected in parallel; at least one of the plurality of modules is provided with an exciting winding magnetically coupled with the plurality of secondary windings involved in the module in question; a closed circuit is constituted by the serial connection of the exciting winding, a battery device on a primary side, and a switching device on the primary side; the ON operation of the plurality of switching devices on the secondary side is continued until after the completion of release of exciting energy stored in the transformer by an ON operation of the switching device on the primary side, into the plurality of battery devices on the secondary side through the plurality of switching devices on the secondary side; whereby voltage equalizing operation similar to that within each single module is achieved also among the plurality of modules, whereby overall voltage equalizing operator is obtained.

Accordingly, there is a further effect that a necessary output voltage can be obtained by an appropriate combination of single modules.

In accordance with an invention, the combination use of the exciting winding and the module equalizing winding permits a miniaturization of the apparatus.

In accordance with an invention, in a voltage equalizing method for battery devices, wherein each of a plurality of closed circuits is constituted of each of a plurality of battery devices (1-1 to 1-n) interconnected in series on a secondary side, each of a plurality of secondary windings (4-1 to 4-n) magnetically coupled with each other in a transformer (3), and each of a plurality of switching devices (2-1 to 2-n) on the secondary side, wherein a closed circuit is constituted of a battery device (1-m) on a primary side, a primary winding (4-m) magnetically coupled with the secondary windings in common, and a switching device (2-m) on the primary side, and wherein the plurality of switching devices on the secondary side and the switching device on the primary side are alternately switched ON and OFF, thereby equalizing the output voltages of the plurality of battery devices interconnected in series on the secondary side; the ON operation of the plurality of switching devices (2-1 to 2-n) on the secondary side is continued until after the completion of release of exciting energy stored in the transformer by an ON operation of the switching device (2-n) on the primary side, into the plurality of battery devices on the secondary side through the plurality of switching devices (2-1 to 2-n) on the secondary side, whereby the voltage equalizing operation is improved in comparison with the related art.

In accordance with an invention, the ON duration of the switching device (2-m) on the primary side is controlled depending on the variation in the output voltages of the plurality of battery devices interconnected in series on the secondary side, whereby the voltage equalizing is performed more effectively depending on the value of the variation.

In accordance with an invention, means for detecting the variation in the output voltages of the plurality of battery devices (1-1 to 1-n) interconnected in series on the secondary side is provided, whereby in case of a large variation, the ON duration of the switching device (2-m) on the primary side and/or the plurality of switching devices (2-1 to 2-n) on the secondary side is extended, whereby the voltage equalizing operation is achieved with a minimum power loss.

In accordance with an invention, in case that the variation in the output voltages of the plurality of battery devices interconnected in series on the secondary side becomes smaller than a predetermined value, the ON duration of the switching device on the first and/or of the switching devices on the primary sides is shortened for the reduction of power consumption for the equalizing after the equalizing has been achieved to an extent (for example, 20 mV), whereby the precision increases in equalizing the terminal voltages of the battery devices because of the reduced equalizing current.

In accordance with an invention, in case of a small variation in the output voltages of the plurality of battery devices interconnected in series on the secondary side, the ON/OFF operation of the switching devices on the first and primary sides is stopped, and/or the ON duration of the switching devices on the first and primary sides is extremely shortened. This avoids power loss and noise due to unnecessary voltage equalizing operation in case of the small variation in the output voltages.

In accordance with an invention, in case that a current greater than or equal to a predetermined value flows through the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation is substantially stopped when the cell voltage detection of each battery device is affected by a voltage drop generated across the internal resistance of the battery device by a high current flowing through the plurality of battery devices interconnected in series on the secondary side, whereby a problem can be avoided even when the high current flows.

In accordance with an invention, during the charge from an external power supply and the discharge to an external load by the plurality of battery devices interconnected in series on the secondary side, the ON/OFF operation of the switching devices on the first and primary sides is stopped, and/or the ON duration of the switching devices on the first and primary sides is extremely shortened, whereby the voltage equalizing operation can be stopped, even without current detection, automatically in response to the operation of a switch (S11) for switching the charge and discharge modes In accordance with an invention, when the plurality of switching devices on the secondary side and the switching device on the primary side are alternately switched ON and OFF, there is a pause in an interval from the switching-OFF of the plurality of switching devices on the secondary side to the switching-ON of the switching device on the primary side and in an interval from the switching-OFF of the switching device on the primary side to the switching-ON of the plurality of switching devices on the secondary side, whereby each switch can be switched ON under the condition of substantially no electric charge in the capacitance component between the terminals of the switch in question (zero-volt switching). This resolves a problem that the switching ON and OFF of the switching device for the voltage equalizing causes a trouble that electric charge stored in the capacitance existing between the terminals of the switching device for the OFF duration of the switching device is discharged by the next ON operation thereby to cause a power loss and a noise due to the short-circuit current.

What is claimed is:

1. A voltage equalizing apparatus comprising:

a core;

a plurality of first battery devices interconnected in series with each other;

a plurality of secondary windings magnetically connected with each other through the core;

a plurality of first switching devices;

wherein a plurality of first closed circuits are formed, and each of the first closed circuits is formed by interconnected in series one of the first battery devices, one of the secondary windings and one of the first switching elements;

a second battery device;

a primary winding magnetically connected with the plurality of secondary windings through the core; and a second switching device connected in series with the second battery device and the primary winding to form a second closed circuit, wherein the plurality of first switching devices and the second switching device are alternately turned ON or OFF to equalize the output voltages of the plurality of first battery devices;

when the second switching device is turned on, exciting energy stored in the core is transported to the plurality of first battery devices through the plurality of first switching elements; and the plurality of first switching devices continue to be turned ON after the transportion of the exciting energy is completed.

2. The voltage equalizing apparatus according to claim 1 further comprising:

a means for detecting variation in the output voltages of the plurality of first battery devices, wherein if the variation is large, the ON duration of the second switching device and/or the plurality of first switching devices is extended.

3. The voltage equalizing apparatus according to claim 2, wherein if the variation is small, the ON/OFF operations of the first switching devices and the second switching device are stopped, and/or the ON durations of the first switching devices and the second switching device are extremely shortened.

4. The voltage equalizing apparatus according to claim 2, wherein if the variation becomes smaller than a predetermined value, the ON duration of the first switching devices and/or the second switching device is shortened for reducing a equalizing current flowing among the first battery devices.

5. The voltage equalizing apparatus according to claim 1, wherein if a current greater than or equal to a predetermined value flows through the plurality of first battery devices, the ON/OFF operations of the first switching devices and the second switching device are stopped, and/or the ON durations of the first switching devices and the second switching device are extremely shortened.

6. The voltage equalizing apparatus according to claim 1, wherein during an external power supply charges the first battery devices or the first battery devices discharges to an external load, the ON/OFF operations of the first switching devices and the second switching device are stopped, and/or the ON durations of the first switching devices and the second switching device are extremely shortened.

7. The voltage equalizing apparatus according to claim 1, wherein when the first switching devices and the second switching device are alternately switched ON or OFF, intervals exist between the switching-OFF of the second switching devices and the switching-ON of the first switching device, and between the switching-OFF of the first switching device and the switching-ON of the second switching devices.

8. An apparatus for equalizing module voltages, comprising:

a plurality of first modules each including: a core; a secondary winding; a first battery device; a module equalizing winding magnetically connected with the secondary winding through the core; and a first switching device connected in series with the first battery device and the secondary winding to form a first closed circuit; and a second module including a second battery device; an exciting winding magnetically connected with the secondary winding and the module equalizing winding through the core in one of the first modules; and a second switching device connected in series with the second battery device and the exciting winding to form a second closed circuit, wherein the module equalizing windings are connected in parallel;

the first switching devices and the second switching device are alternately turned ON or OFF to equalize the output voltages of the plurality of first battery devices;

when the second switching device is turned on, exciting energy stored in the cores transported to the plurality of first battery devices; and the first switching devices continue to be turned ON after the transportation of the exciting energy is completed.

9. The apparatus according to claim 8, wherein the exciting winding is one of the module equalizing windings.

10. The apparatus according to claim 8, wherein in each of the plurality of first modules, the secondary winding including a plurality of secondary winding; the first battery device including a plurality of first battery devices; and the first switching device including a plurality of first switching devices each connected in series with one of the first battery devices and one of the secondary windings to form a plurality of first closed circuits;

wherein the module equalizing winding magnetically connected with the plurality of secondary windings through the core.

11. A method of equalizing a voltage using a voltage equalizing apparatus comprising: a core; a plurality of first battery devices interconnected in series with each other; a plurality of secondary windings magnetically connected with each other through the core; a plurality of first switching devices; a plurality of first closed circuits each including one of the first battery devices, one of the secondary windings, and one of the first switching elements interconnected in series with the one of the first battery devices and the one of the secondary windings; a second battery device; a primary winding magnetically connected with the plurality of secondary windings through the core; and a second switching device connected in series with the second battery device and the primary winding to form a second closed circuit, the method comprising:

turning the second switching device ON and providing a current with the primary winding from the second battery device to store exciting energy in the core;

turning the second switching device OFF;

turning the first switching devices ON and providing a current with the first battery devices from the secondary windings, the current generated due to the exciting energy in the core;

turning the first switching devices OFF; and continuing the above steps to equalize the output voltages of the first battery devices, wherein the first switching devices continue to be turned ON after the transportion of the exciting energy is completed.

12. The method according to claim 11, further comprising a step of controlling the ON duration of the second switching device depending on variation in the output voltages of the first battery devices.

13. The method according to claim 12, wherein in case of a large variation in the output voltages of the plurality of battery devices interconnected in series on the secondary side, the ON duration of the switching device on the primary side and/or the plurality of switching devices on the secondary side is extended.

14. The method according to claim 12, wherein if the variation is small, the ON/OFF operations of the first switching devices and the second switching device are stopped, and/or the ON durations of the first switching devices and the second switching device are extremely shortened.

15. The method according to claim 12, wherein if the variation becomes smaller than a predetermined value, the ON duration of the first switching devices and/or the second switching device is shortened for reducing a equalizing current flowing among the first battery devices.

16. The method according to claim 11, wherein if a current greater than or equal to a predetermined value flows through the plurality of first battery devices, the ON/OFF operations of the first switching devices and the second switching device are stopped, and/or the ON durations of the first switching devices and the second switching device are extremely shortened.

17. The method according to claim 11, wherein during an external power supply charges the first battery devices or the first battery devices discharges to an external load, the ON/OFF operations of the first switching devices and the second switching device are stopped, and/or the ON durations of the first switching devices and the second switching device are extremely shortened.

18. The method according to claim 11, wherein when the first switching devices and the second switching device are alternately switched ON or OFF, intervals exist between the switching-OFF of the second switching devices and the switching-ON of the first switching device, and between the switching-OFF of the first switching device and the switching-ON of the second switching devices.

* * * * *